United States Patent
Matsumoto et al.

(10) Patent No.: US 9,605,473 B2
(45) Date of Patent: *Mar. 28, 2017

(54) PROTECTOR WITH SENSOR AND METHOD OF MOLDING END PART OF THE SAME

(71) Applicant: Nishikawa Rubber Co., Ltd., Hiroshima-shi, Hiroshima-ken (JP)

(72) Inventors: Michihiko Matsumoto, Hiroshima (JP); Yuzo Hirakawa, Hiroshima (JP)

(73) Assignee: NISHIKAWA RUBBER CO., LTD., Hiroshima-Shi, Hiroshima-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/639,777

(22) Filed: Mar. 5, 2015

(65) Prior Publication Data

US 2015/0267462 A1 Sep. 24, 2015

(30) Foreign Application Priority Data

Mar. 18, 2014 (JP) ................................. 2014-054894

(51) Int. Cl.
*E06B 7/36* (2006.01)
*H01H 9/04* (2006.01)
(Continued)

(52) U.S. Cl.
CPC .......... *E06B 7/36* (2013.01); *B29C 45/14065* (2013.01); *B60J 10/273* (2016.02); *G01D 5/14* (2013.01); *G01D 11/16* (2013.01); *G01D 11/24* (2013.01); *G01L 1/005* (2013.01); *H01H 9/04* (2013.01); *B29K 2019/00* (2013.01); *B29L 2031/3055* (2013.01); *E05F 15/44* (2015.01); *E05F 15/443* (2015.01);
(Continued)

(58) Field of Classification Search
CPC ......... B60J 10/273; H01H 9/04; H01H 3/142; E05Y 2800/46; E05Y 2600/40; E05F 15/44; E05F 15/443
USPC ..................................................... 73/862.541
See application file for complete search history.

(56) References Cited

U.S. PATENT DOCUMENTS 6,120,327 A 9/2000 O'Brien et al.
6,339,305 B1 * 1/2002 Ishihara .................. E05F 15/44
318/282

(Continued)

FOREIGN PATENT DOCUMENTS

JP 2011022038 A 2/2011

OTHER PUBLICATIONS

Extended Search Report corresponding to Application No. 15157082.7 dated Aug. 8, 2015 (9 pages).

*Primary Examiner* — Laura Martin
*Assistant Examiner* — Suman K Nath
(74) *Attorney, Agent, or Firm* — Robert P. Michael, Esq.; Carter, DeLuca, Farrell & Schmidt, LLP (57) ABSTRACT

A protector with a sensor is installed on a sliding door for detecting an object by touch between two core wires in a hollow part. In a terminal part of the protector with the sensor, the core wires drawn out are connected with leads joined with a control unit. A primary seal is formed by means of injection molding for covering wire connection parts and another end side of an insert while also covering a skin of a wire harness which ties and coats the two leads. A secondary seal is formed by means of the injection molding for coating a part formed with the primary seal and for forming an external shape of a product.

17 Claims, 9 Drawing Sheets

(51) Int. Cl.
*B29C 45/14* (2006.01)
*G01D 5/14* (2006.01)
*G01D 11/16* (2006.01)
*G01D 11/24* (2006.01)
*G01L 1/00* (2006.01)
*B60J 10/273* (2016.01)
*H01H 3/14* (2006.01)
*B29K 19/00* (2006.01)
*B29L 31/30* (2006.01)
*E05F 15/44* (2015.01)

(52) U.S. Cl.
CPC ....... *E05Y 2600/40* (2013.01); *E05Y 2800/46* (2013.01); *H01H 3/142* (2013.01)

(56) References Cited

U.S. PATENT DOCUMENTS

2012/0222296 A1* 9/2012 Miyamoto ............ E05F 15/443
    29/825
2013/0333488 A1* 12/2013 Ishihara .................... G01L 1/04
    73/862.621
2014/0339842 A1* 11/2014 Kawaguchi ............ B60J 5/0495
    296/1.04

* cited by examiner

PROTECTOR WITH SENSOR AND METHOD OF MOLDING END PART OF THE SAME

CROSS REFERENCE TO RELATED APPLICATION

This application claims the benefit under 35 USC §119 of JP Patent Application JP 2014-054894 filed Mar. 18, 2014, the entire disclosure of which is incorporated herein by reference.

BACKGROUND INFORMATION

The present invention relates to protectors with sensors and methods of molding end parts of the protectors with the sensors. When objects including fingers are disposed between openings of automobiles and opening/closing panels which move between at least two positions to open and close the openings of automobiles, the sensors of the protectors output corresponding signals for detecting the objects. The opening/closing panels include: doors such as sliding doors on wagons, station wagons or the like sliding frontward and rearward of the automobile bodies and back doors; and sun roofs.

Figure 5:
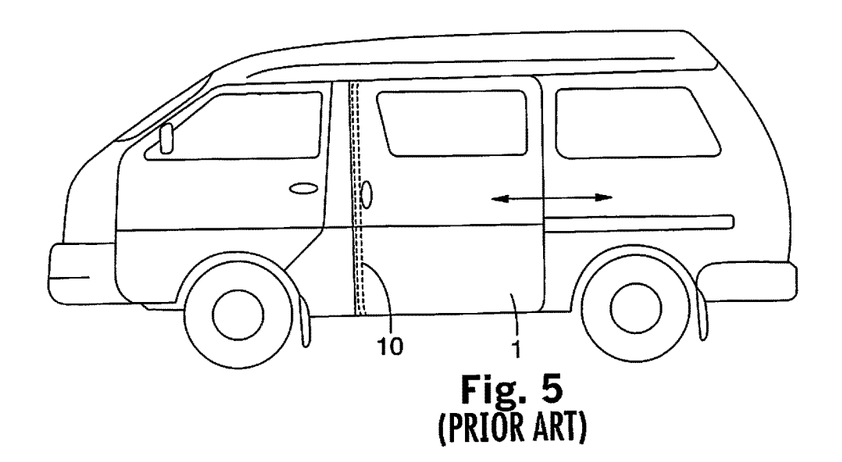
FIG. 5 is a side view of an automobile which opens or closes by a sliding door.
Figure 6:
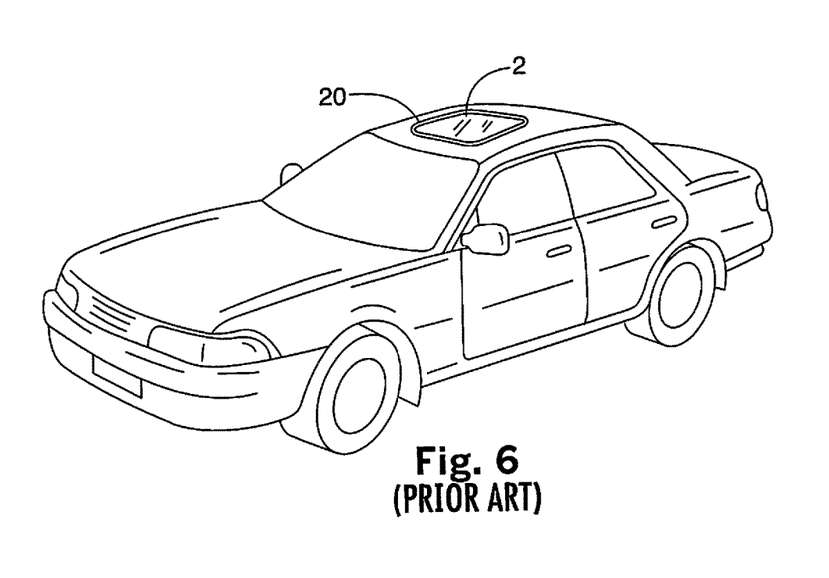
FIG. 6 is a perspective view of an automobile with a sun roof.

A protector 10, 20 with a sensor is installed on an automobile including a wagon shown in FIG. 5 of which a sliding door 1 (or a back door) moves between at least two positions to open and close an opening of an automobile body or on an automobile shown in FIG. 6 of which sun roof 2 opens or closes the opening of the automobile body.

Figure 7:
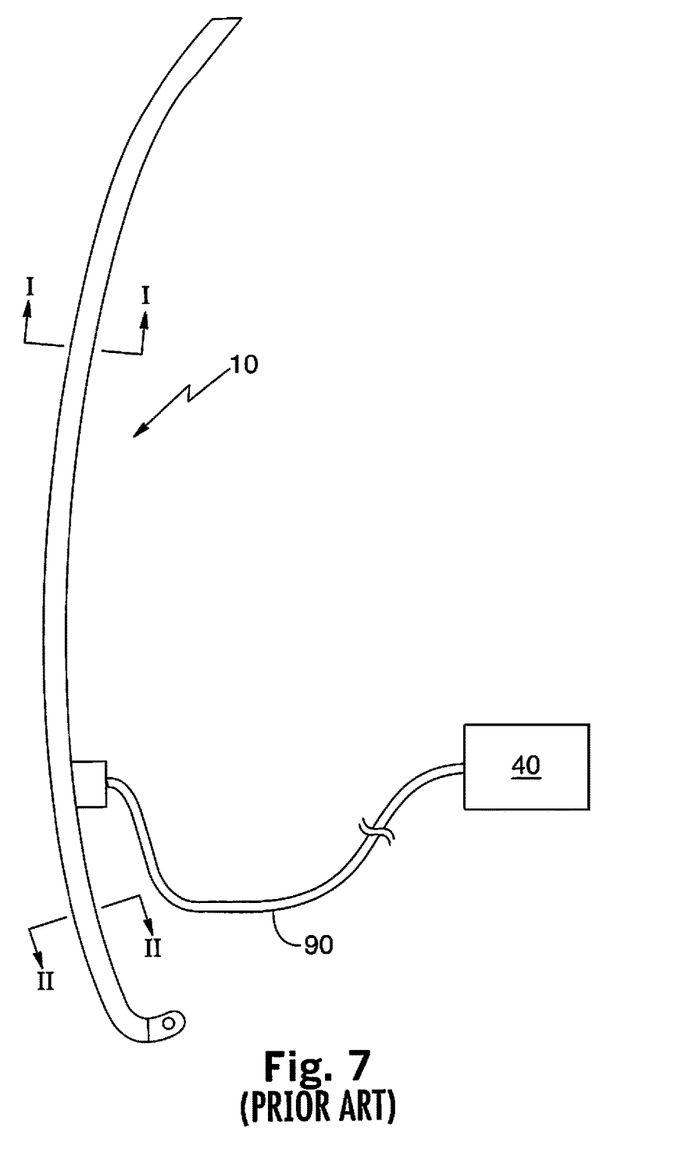
FIG. 7 is a side view of the protector with the sensor of FIG. 5.

For example, the protector 10 with the sensor, extending in an upper and lower direction as shown in FIG. 7, is installed on a front end surface of the sliding door 1. The protector 10 with the sensor extends frontward of the automobile body from the front end surface of the sliding door 1.

Figure 8:
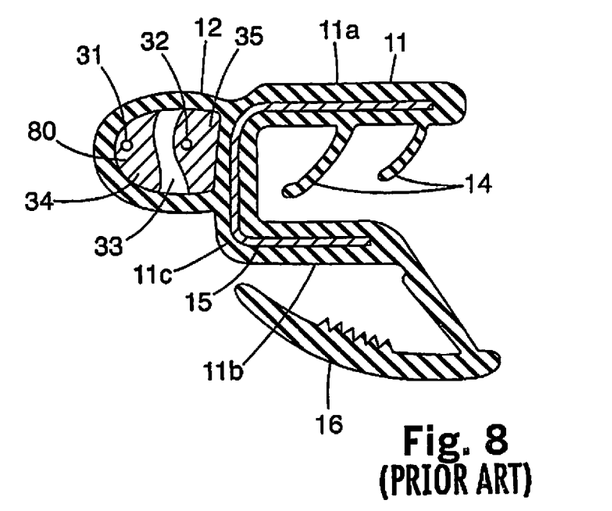
FIG. 8 is a I-I line enlarged cross section of FIG. 7.
Figure 9:
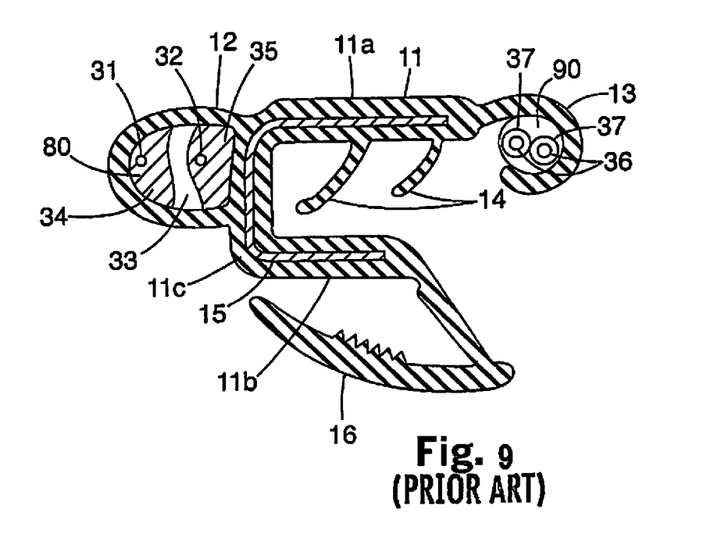
FIG. 9 is a II-II line enlarged cross section of FIG. 7.

As shown in FIG. 8 and FIG. 9, the protector 10 with the sensor, installed on the front end surface of the sliding door 1 includes: an installation base member 11 having a substantially U-shaped cross section including an inner-cabin side wall 11a, an outer-cabin side wall 11b and a connecting wall 11c; and a hollow part 12 integrally molded with the installation base member 11. The hollow part 12 includes a sensor (pressure sensitive sensor) 80 which outputs a corresponding electric signal upon detecting the object such as a part of human bodies (fingers, hands or legs) between the sliding door 1 and a body side opening (may also be front door or side door) (see, for example, Japanese examined Patent Publications No. 3700267, No. 3844684 and Japanese unexamined Patent Publication No. 2011-022038).

In a lower part of the protector 10 with the sensor, a channel part 13 having a substantially C-shaped cross section is integrally molded with the inner-cabin side wall 11a side of the installation base member 11 for holding wire harness 90 joined with the pressure sensitive sensor 80. The installation base member 11 has a plurality of holding lips 14 formed inside and a core 15 having a substantially U-shaped cross section embedded therein for increasing rigidity. In addition, a decorative lip 16 is provided on the outer-cabin side wall 11b of the installation base member 11.

The sensor (pressure sensitive sensor) 80 has two core wires (electrode wires) 31, 32 extending in an upper and lower direction (longitudinal direction) embedded in rubber like elastic bodies 34, 35 having conductivity with a space 33 therebetween, which are fixed in the hollow part 12. As the object is disposed between the sliding door 1 and the body side opening when the sliding door 1 is moved towards a closed position, the object makes contact with a part of the hollow part 12, and then the rubber like elastic bodies 34, 35 contact with each other and the two core wires 31, 32 short. Resultant change in electric signal is transmitted to a control unit 40 joined with leads 36, 36 which are connected with the two core wires 31, 32 in a lower side terminal part of the protector 10 with the sensor, and as a result, the objects are detected. The leads 36, 36 covered with insulator are tied by the wire harness 90. Top ends of the leads 36, 36, bared from covered parts 37, 37 are naked wires.

Figure 10A:
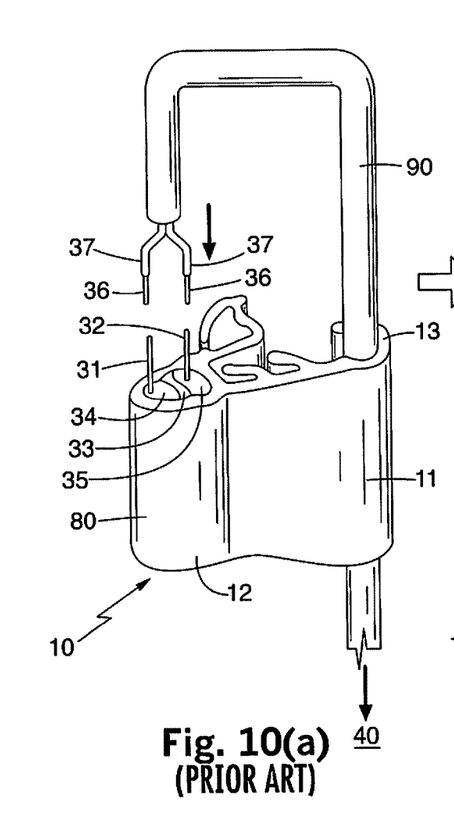
FIG. 10(a), FIG. 10(b) and FIG. 10(c) are perspective views of ordinary processes before die molding a lower side terminal part of a protector with a sensor.
Figure 10B:
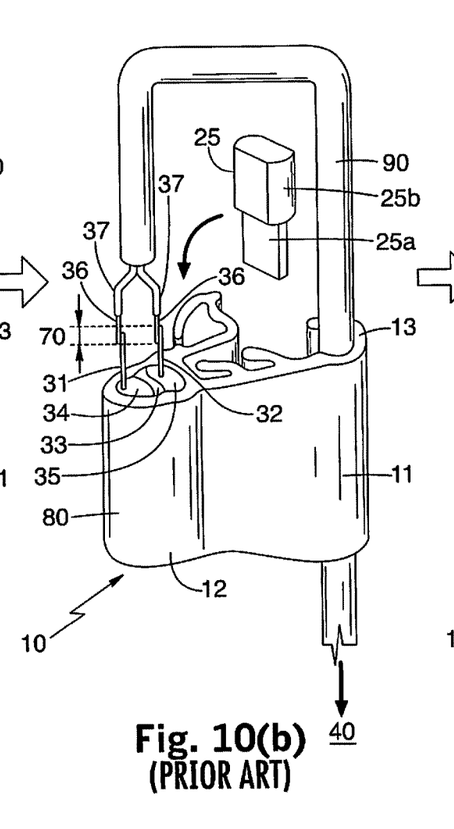
Figure 10C:
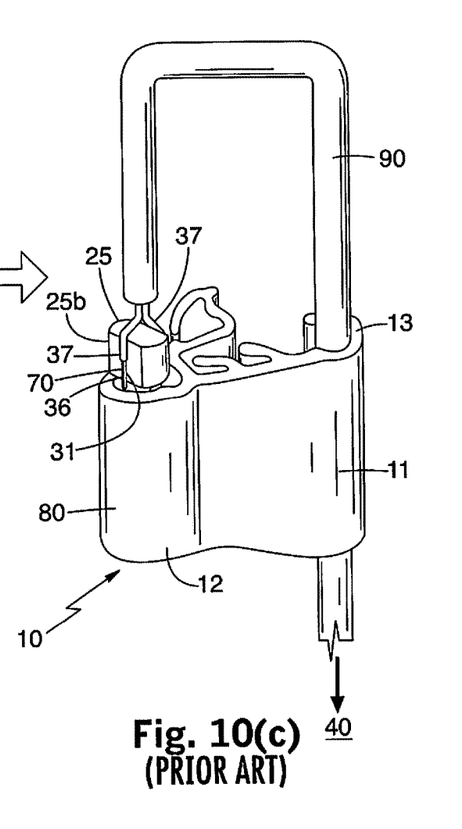
Figure 11:
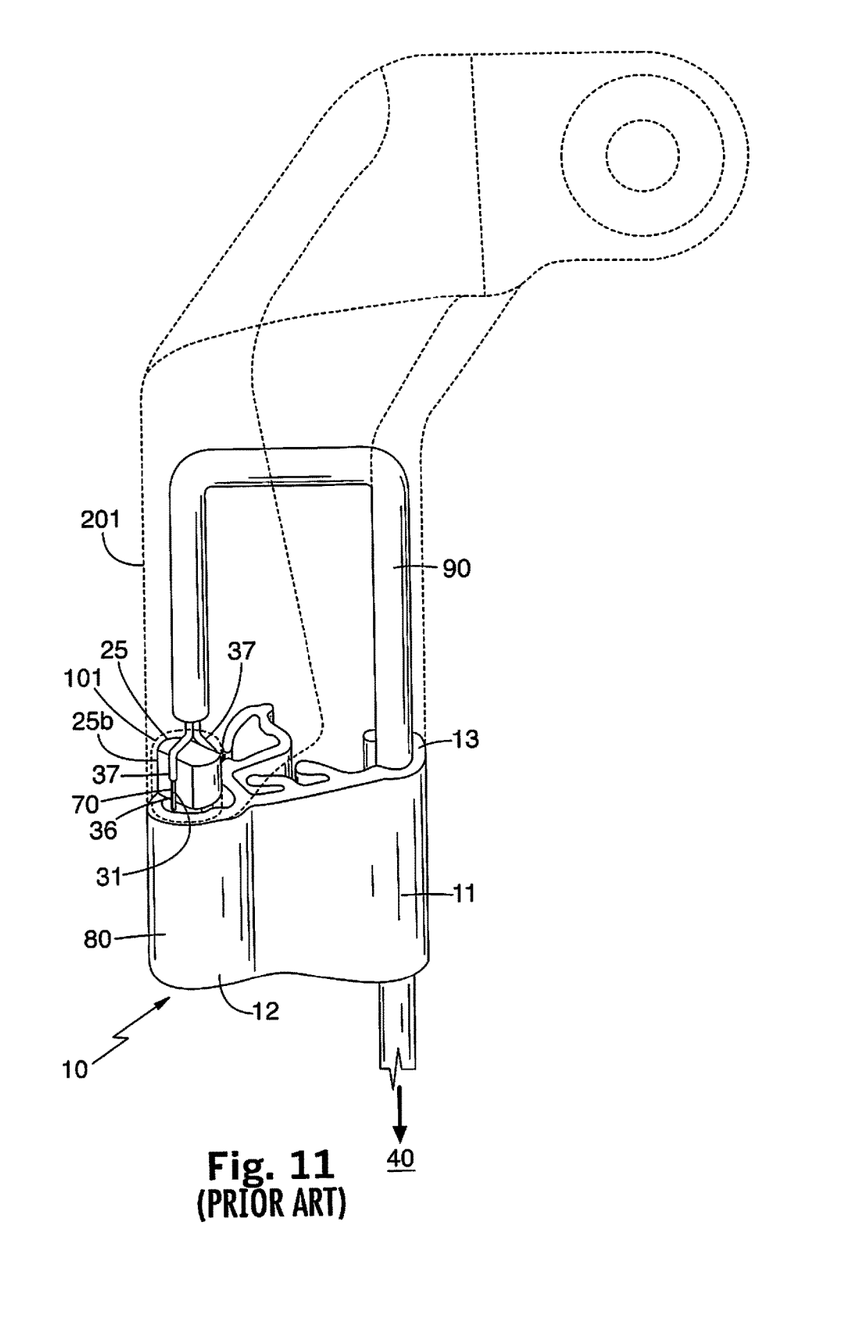
FIG. 11 is a perspective view of a structural gist of the lower side terminal part of the protector with the sensor after die molding according to the prior art.

As shown in FIGS. 10(a) to 10(c), in the lower side terminal part of the protector 10 with the sensor, the leads 36 are piled on the two core wires 31, 32 drawn out in a longitudinal direction (left direction in FIGS. 10(a) to 10(c) relative to a sheet), the leads 36 and the two core wires 31, 32 are connected by means of resistance welding or soft soldering (FIG. 10(b)) and an insert 25 fills up the space 33 which is exposed in an end part (FIG. 10(c)). Then, as shown in FIG. 11, a wire connection part 70, 70 the insert 25 and a part of the wire harness 90 are embedded in a die molded part by means of die molding and are not exposed.

When water enters the wire connection parts 70, 70, connected circuits may short, which causes improper operations. The wire connection parts 70, 70 are between the two core wires 31, 32 and the leads 36, 36 of the lower side terminal part of the protector 10 with the sensor. The wire connection parts 70, 70 are connected by means of resistance welding or soft soldering.

In this connection, the wire connection parts 70, 70 can be firmly fixed by sealing agent (adhesive) of epoxy resin disclosed in Japanese examined Patent Publication No. 3700267. But the structure necessitates an extra process of adhesion and minutes or hours of time for curing the sealing agent. In addition, an increase in amount of adhesive to be used has caused insufficient adhesion. Further, use of adhesive tends to cause unevenness, which makes it difficult to stably fix the wire connection parts 70, 70.

Especially, in case the wire connection parts 70, 70 are not stably fixed, external shapes of resultant products become uneven while die molding the external shapes.

Alternatively, the wire connection parts 70, 70 can be doubly coated by means of hot melt molding disclosed in Japanese examined Patent Publication No. 3844684. But the structure necessitates extra members including supporting members for connecting hard-wirings, has a problem concerning heat-resistance and is degraded in mold releasability from the dies.

In this connection, as shown in FIG. 11, the wire connection parts 70, 70 between the core wires 31, 32 and the leads 36, 36 and another end side of the insert 25 can be covered by a primary sealing layer 101 formed by injection molding. But the covered part 37, 37 of the leads 36, 36 are hard to position on the dies. The lower side terminal part of the protector 10 with the sensor also has a secondary sealing layer 201 formed thereon. The secondary sealing layer 201 forms an external shape of the product.

Japanese unexamined Patent Publication No. 2011-022038 discloses to mold resin material into a hollow terminal part for coating the wire connection parts. But the structure does not include the insert inserted into the terminal part for separating the two wire connection parts from each other. Accordingly, the structure necessitates an extra part made of the resin material for preventing the two wire connection parts from coming into contact with each other by partitioning the two wire connection parts.

The structure of Japanese unexamined Patent Publication No. 2011-022038 does not include the insert inserted into the terminal part. Accordingly, at a later stage of die molding, an extra lid or a weir needs to be molded for preventing decline in sensor function caused by die molding material flowing into a sensor side.

Therefore, an object of the present invention is to provide the protectors with sensors and the methods of molding the end parts of the protectors with the sensors, which are capable of decreasing unevenness in the shapes of the products while die molding the terminal parts, excellent in operability and capable of attaining sufficient sealing function.

SUMMARY

In order to achieve the above-mentioned object, according to one aspect of the invention, a protector with a sensor is provided, the protector with the sensor including: an installation base member (11) operatively coupled on a peripheral edge of an opening/closing panel which moves between at least two positions to open and close an opening of an automobile body or on a peripheral edge of said opening of the automobile body, the opening/closing panel including a door (1) and a sun roof (2) of an automobile; and a hollow part (12) unified with the installation base member (11), the hollow part (12) having two core wires (31, 32) and a space (33) provided therein, the space (33) being positioned between the two core wires (31, 32); said installation base member (11) and said hollow part (12) forming an extrusion molded part made of a rubber like elastic body, in which:

when an object is disposed between said opening/closing panel and said opening and makes contact with said hollow part (12) when said opening/closing panel is moved towards a closed position, a corresponding change in electric signal detects said object; and in a terminal part of said extrusion molded part, said core wires (31, 32) drawn out in a longitudinal direction are connected with two leads (36, 36) drawn out from an end part of a wire harness (90), said two leads (36, 36) being joined with a control unit (40), said two leads (36, 36) being covered with an insulator, the wire harness (90) being formed by tying the two leads (36, 36) and covering the two leads (36, 36) with skin, and one end side of an insert (25) made of a non-conductive material is inserted in and fills up said space (33), and said terminal part of said extrusion molded part is die molded, wherein:

the terminal part of said extrusion molded part has a primary sealing layer (100) and a secondary sealing layer (200) formed thereon by means of injection molding respectively, said primary sealing layer (100) covering wire connection parts (70, 70) of said core wires (31, 32) and said leads (36, 36) and another end side of said insert (25) while also covering the skin of said wire harness (90), and said secondary sealing layer (200) being piled on and covering the primary sealing layer (100), and said secondary sealing layer (200) forming an external shape of a product.

It is to be noted that the "change in electric signal" includes a change by short between the two core wires, and a change in capacitance.

In addition, according to an aspect of the present invention, in the terminal part of said extrusion molded part, said secondary sealing layer (200) abuts an end surface and coats a side surface of said hollow part (12) and said secondary sealing layer (200) abuts an end surface and does not coat a side surface said installation base member (11).

In addition, according to an aspect of the present invention, die molding material of said primary sealing layer (100) includes the rubber like elastic body which fuses the terminal part of said extrusion molded part during the injection molding of said primary sealing layer (100) and the die molding material of said secondary sealing layer (200) includes the rubber like elastic body which fuses said primary sealing layer (100) during the injection molding of said secondary sealing layer (200).

In addition, according to an aspect of the present invention, the skin of said wire harness (90) fuses one of or both of said primary sealing layer (100) and said secondary sealing layer (200).

In addition, according to an aspect of the present invention, the die molding material of said primary sealing layer (100) includes one of or a blend among not less than two of: ethylene-propylene copolymer, EPDM, or EPM; or TPO or TPS. Alternatively, the die molding material of said primary sealing layer (100) may include TPO or TPS which does not melt during the injection molding of the secondary sealing layer (200). In addition, according to an aspect of the present invention, said primary sealing layer (100) is colorless and transparent or colorless and semitransparent. It is to be noted that "which does not melt" means that the die molding material of the primary sealing layer does not plastically deform at a temperature of the injection molding.

In addition, according to an aspect of the present invention, a method of molding an end part of a protector with a sensor is provided, the protector with the sensor including: an installation base member (11) operatively coupled on a peripheral edge of an opening/closing panel which moves between at least two positions to open and close an opening of an automobile body or on a peripheral edge of said opening of the automobile body, the opening/closing panel including a door (1) and a sun roof (2) of an automobile; and a hollow part (12) unified with the installation base member (11), the hollow part (12) having two core wires (31, 32) and a space (33) provided therein, the space (33) being positioned between the two core wires (31, 32); said installation base member (11) and said hollow part (12) forming an extrusion molded part made of a rubber like elastic body, in which:

when an object is disposed between said opening/closing panel and said opening and makes contact with said hollow part (12) when said opening/closing panel is moved towards a closed position, a corresponding change in electric signal detects said object; and in a terminal part of said extrusion molded part, said core wires (31, 32) drawn out in a longitudinal direction are connected with two leads (36, 36) drawn out from an end part of a wire harness (90), said two leads (36, 36) being joined with a control unit (40), said two leads (36, 36) being covered with an insulator, the wire harness (90) being formed by tying the two leads (36, 36) and covering the two leads (36, 36) with skin, and one end side of an insert (25) made of a non-conductive material is inserted in and fills up said space (33), and said terminal part of said extrusion molded part is die molded, the method including:

forming a primary seal by positioning the skin of the end part of the wire harness (90) as well as the terminal part of said extrusion molded part on a die, and then covering wire connection parts (70, 70) of said core wires (31, 32) and said leads (36, 36) and another end side of said insert (25) while also covering the skin of the wire harness (90) by means of injection molding; and forming a secondary seal on a part, formed with the primary seal, for forming an external shape of a product by means of the injection molding.

Symbols in parentheses show constituents or items corresponding to the drawings.

According to the present invention, the terminal part of the extrusion molded part is die molded after the one end side of the insert made of the non-conductive material is inserted in and fills up the space. The structure prevents decline in sensor function caused by die molding material flowing into a side of the sensor from the space on the terminal part of the extrusion molded part during the die molding. Accordingly, an extra lid or weir does not need to be molded on the terminal part of the extrusion molded part. In addition, one end side of the insert inserted in the space separates two wire connection parts from each other and prevents the two wire connection parts from coming into contact with each other. Accordingly, the structure does not necessitate an extra part made of the resin material for partitioning the two wire connection parts as in the prior art.

The wire connection parts of the core wires and the leads joined with the control unit, which are exposed from the terminal part of the extrusion molded part of the protector with the sensor, are doubly sealed by the primary sealing layer and the secondary sealing layer. The structure improves certainty in sealing property in the terminal part.

In addition, the primary sealing layer and the secondary sealing layer are formed by means of the ordinary injection molding. Accordingly, as compared with a case using adhesive, the structure does not necessitate time for curing the sealing agent, which reduces time for operation and lowers cost. Also, the structure does not necessitate extra members including supporting members as in the prior art, which simplifies the operation. Further, since the structure enables to quantitatively inject the die molding material into the dies at a constant pressure, resultant products are hardly uneven and perform stable sealing function.

When forming the primary sealing layer which directly covers the wire connection parts by means of injection molding, the skin of the end part of the wire harness as well as the terminal part of the extrusion molded part are positioned on the die for covering the wire connection parts of the core wires and the leads and another end side of the insert, while also covering the skin of the wire harness. The structure is different from a prior art (FIG. 11) in which covered parts of the leads drawn out from the end part of the wire harness are positioned on the die. Accordingly, the structure is excellent in operability and is capable of stably holding the wire connection parts while forming the external shape of the product by the secondary sealing layer so that the wire connection parts are hardly affected by injection molding pressure. In addition, since the primary sealing layer is formed by means of the injection molding, each of the resultant primary sealing layers of the resultant products are uniform in the external shapes (size, shape and surface condition). Accordingly, unevenness in the external shapes of the resultant products which arises while molding the secondary seal is prevented.

The structure prevents unevenness in flow of the material of the secondary sealing layer during the injection molding in case the primary sealing layer is not formed, thereby preventing unevenness in the resultant secondary sealing layer thus manufactured. The unevenness in flow of the material is caused by: installing conditions of the wire connection parts of the core wires and the leads; arranging conditions of the leads drawn out from the end parts of the wire harness; or external shapes of protrusion parts of the inserts. The primary sealing layer which is simple in the external appearance and flat in the surface decreases resistance to the flow of the materials injected during the injection molding of the secondary seal, does not complicate the flow of the material, and prevents unevenness in the external shape of the secondary sealing layer. In addition, the structure that the wire connection parts are coated by the primary sealing layer certainly prevents exposure of the wire connection parts on the external appearance of the product after the secondary sealing layer is molded.

In addition, the die molding material of the primary sealing layer includes the rubber like elastic body which fuses the terminal part of the extrusion molded part during the injection molding of the primary sealing layer. The extrusion molded part is made of the rubber like elastic body and is extrusion molded. The die molding material of the secondary sealing layer also includes the rubber like elastic body which fuses the primary sealing layer during the injection molding of the secondary sealing layer. The structure is improved in following-up property and the primary sealing layer and the secondary sealing layer do not easily come off even in case the primary sealing layer and the secondary sealing layer are subjected to stress.

In addition, the skin of the wire harness fuses one of or both of the primary sealing layer and the secondary sealing layer. The structure prevents entrance of water from outside.

In addition, the primary sealing layer of the present invention is colorless and transparent or colorless and semi-transparent. The structure enables to visually confirm the condition of the wire connection parts, which enables inspections of breakings of the wire connection parts, omissions in welding or the like, thereby improving certainty in quality.

DETAILED DESCRIPTION

Referring to the Drawings, a protector with a sensor according to an embodiment of the present invention will be described.

A protector 10 with a sensor of the embodiment of the present invention, which extends toward a front side of an automobile body is installed on a front end surface of a sliding door 1 of an automobile shown in FIG. 5 of which the sliding door 1 moves between at least two positions to open and close an opening of the automobile body. A sensor (pressure sensitive sensor) 80 installed on the protector 10 with the sensor outputs corresponding electric signal upon detecting an object such as a part of human body (finger, hand or leg) between the sliding door 1 and a body side opening (may also be front door or side door). Both the present invention and the prior art include the structures of FIG. 7 to FIG. 10. But the present invention is different from the prior art shown in FIG. 11 in structure of a terminal part of the protector 10 with the sensor after die molding and method of die molding the same. When constituents or items correspond to those in prior arts, the same symbols are used.

The protector 10 with the sensor includes: an installation base member 11 operatively coupled on a flange (not shown) formed on a sliding door 1 directly; a hollow part 12 integrally molded with the installation base member 11 and which makes elastic contact with the object when the object including a finger is disposed between a front end surface of the sliding door 1 and a body side opening which faces the front end surface when the door 1 is moved towards a closed position; and the sensor (pressure sensitive sensor) 80 which is incorporated in the hollow part 12 and which outputs a corresponding electric signal upon detecting the object. The sensor (pressure sensitive sensor) 80 has two core wires (electrode wires) 31, 32 extending in an upper and lower direction (longitudinal direction) embedded in rubber like elastic bodies 34, 35 having conductivity with a space 33 therebetween, which are fixed in the hollow part 12. The rubber like elastic bodies 34, 35 having conductivity are made of conductive rubber mainly including synthetic rubber including EPDM. The sensor 80 is integrally molded with the hollow part 12.

Figure 1:
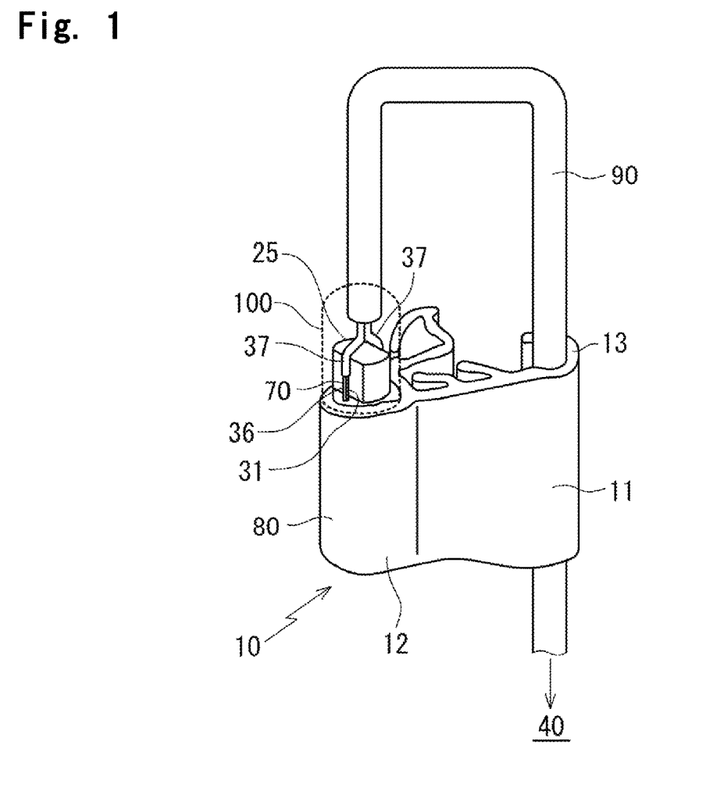
FIG. 1 is a perspective view of a lower side terminal part of a protector with a sensor according to an embodiment of the present invention, having a primary sealing layer formed thereon.

As shown in FIG. 1, in a lower side terminal part of the protector 10 with the sensor, an insert 25 fills up the space 33 of the hollow part 12 which is open in an end side terminal part.

The installation base member 11 and the hollow part 12 of the protector 10 with the sensor form an extrusion molded part made of a rubber like elastic body including: synthetic rubber such as EPDM; and thermoplastic elastomer such as TPO, TPS. The upper and lower side terminal parts of the protector 10 with the sensor are die molded for arranging an external shape thereof.

The insert 25 is made of polypropylene, polyethylene, polyethylene terephthalate, nylon, 6 nylon, 6-6 nylon or thermoplastic elastomer (TPE). Examples of the material of the insert 25 also include flexible and non-conductive material such as olefin TPO or stylene TPS of TPE. The insert 25 includes an insertion part 25a on one end side and a protrusion part 25b on another end side.

The insertion part 25a has a cross sectional shape which is substantially the same as or a little larger than the space 33 for being inserted in the space 33 of the hollow part 12 and tightly filling up the space 33, thereby preventing decline in sensor function caused by die molding material flowing in the space 33 during die molding.

On both side surfaces of the protrusion part 25b, the two wire connection parts 70, 70 are exposed. The wire connection parts 70, 70 are formed by piling the two leads 36, 36 on the two core wires 31, 32 and connecting the two leads 36, 36 and the two core wires 31, 32 by means of resistance welding or soft soldering. The two leads 36, 36 as top ends are naked wires bared from covered parts 37. The two core wires 31, 32 are drawn out toward an upside in the longitudinal direction (upper direction in FIG. 1 relative to a sheet).

The two leads 36, 36 which are covered with insulators respectively are tied by the wire harness 90 and an outer circumferential surface of the two leads 36, 36 thus tied is coated by skin of the wire harness 90. On an end part of the wire harness 90, the two leads 36, 36 are drawn out from the covered parts 37, 37 which are drawn out from the end part of the wire harness 90, and are bared from the covered parts 37, 37. The wire harness 90 is joined with a control unit 40 in which the object is detected.

The insertion part 25a of the insert 25 fills up the space 33. Then, the protrusion part 25b of the insert 25 and the wire connection parts 70, 70 are embedded in a die molded part by die molding a lower end of the protector 10 and are not exposed.

The lower end of the protector 10, which is extrusion molded, has a primary sealing layer 100 and a secondary sealing layer 200 formed thereon by means of injection molding respectively. The primary sealing layer 100 covers the wire connection parts 70, 70 of the core wires 31, 32 and the two leads 36, 36 and the protrusion part 25b of the insert 25, which are exposed from the terminal part, from an outside while also covering the skin of the wire harness 90. The secondary sealing layer 200 is piled on and covers the primary sealing layer 100. The secondary sealing layer 200 forms an external shape of a product.

The skin of the wire harness 90 is made of a non-conductive material and fuses at least the primary sealing layer 100. The structure that the skin of the wire harness 90 fuses the primary sealing layer 100 prevents entrance of water toward an electrical component including the core wires 31, 32 and the leads 36 from the outside. Entrance of water is further prevented when the secondary sealing layer 200 fuses the skin of the wire harness 90.

In order for the skin and the primary sealing layer 100 and the secondary sealing layer 200 to fuse, the skin may be made of a material which is similar to or the same as a material of at least one of the primary sealing layer 100 and the secondary sealing layer 200. In case the material does not directly fuse, applying adhesive or primer on the skin or the covered parts enables the material to fuse. In addition, in order for the covered parts 37, 37 of the leads 36, 36 to fuse the primary sealing layer 100, in the same manner as the wire harness 90, the covered parts 37, 37 may be made of the material which is similar to or the same as the material of at least one of the primary sealing layer 100 and the secondary sealing layer 200. Also, in case the material does not directly fuse, applying the adhesive or the primer on the skin or the covered parts enables the material to fuse. The structure further prevents entrance of water toward the electrical component.

As shown in FIG. 1, a method of molding the lower end of the protector 10 with the sensor includes: positioning the terminal part of the protector 10 with the sensor, of which the core wires 31, 32 and the leads 36, 36 are connected, in a primary die not shown; and forming the primary sealing layer 100 for covering the wire connection parts 70, 70 and the protrusion part 25b of the insert 25 from the outside by means of the ordinary injection molding. The primary sealing layer 100 is formed by means of injection molding in a manner to overlap the skin of the wire harness as shown in FIG. 1, that is from an end surface over a side surface (outer circumferential surface) of the wire harness 90. That is, the terminal part of the protector 10 with the sensor including the skin of the wire harness 90 is positioned on the primary die.

The die molding material of the primary sealing layer 100 fuses the lower end of the protector 10 with the sensor during the injection molding of the primary sealing layer 100. The die molding material of the primary sealing layer 100 may include any kind of resin composite containing olefin thermoplastic resin. Examples of the die molding material of the primary sealing layer 100 include: the thermoplastic resin containing at least one of polyethylene and polypropylene; polyethylene; and polypropylene. The examples also include: copolymer of polyethylene and polypropylene (ethylene-propylene copolymer), having rubber like elasticity. Examples of the copolymer include: Hifax (registered trademark); Adflex (registered trademark); Softell (registered trademark); P.E.R. (Tokuyama Corporation); Vistamaxx (registered trademark); which are known as a reactor type.

The examples of the die molding material of the primary sealing layer 100 further include: EPDM (ethylene-propylene-diene terpolymer) and EPM (ethylene-propylene copolymer).

The examples of the die molding material of the primary sealing layer 100 further include: TPO (olefin thermoplastic elastomer); and TPS (styrene thermoplastic elastomer) containing olefin resin; which are excellent in heat resistance and pressure resistance so that the primary sealing layer 100 does not melt during the injection molding of the secondary sealing layer 200.

The die molding material of the primary sealing layer 100 may also include a blend of not less than two of the above-mentioned thermo plastic resin composite.

The resin composite which is colorless and transparent or colorless and semitransparent enables to visually confirm the condition of the wire connection parts 70, 70. The structure enables inspections of breakings of the wire connection parts, omissions in welding or the like, thereby improving certainty in quality. The resin composite preferably is flexible and has rubber elasticity.

Figure 2:
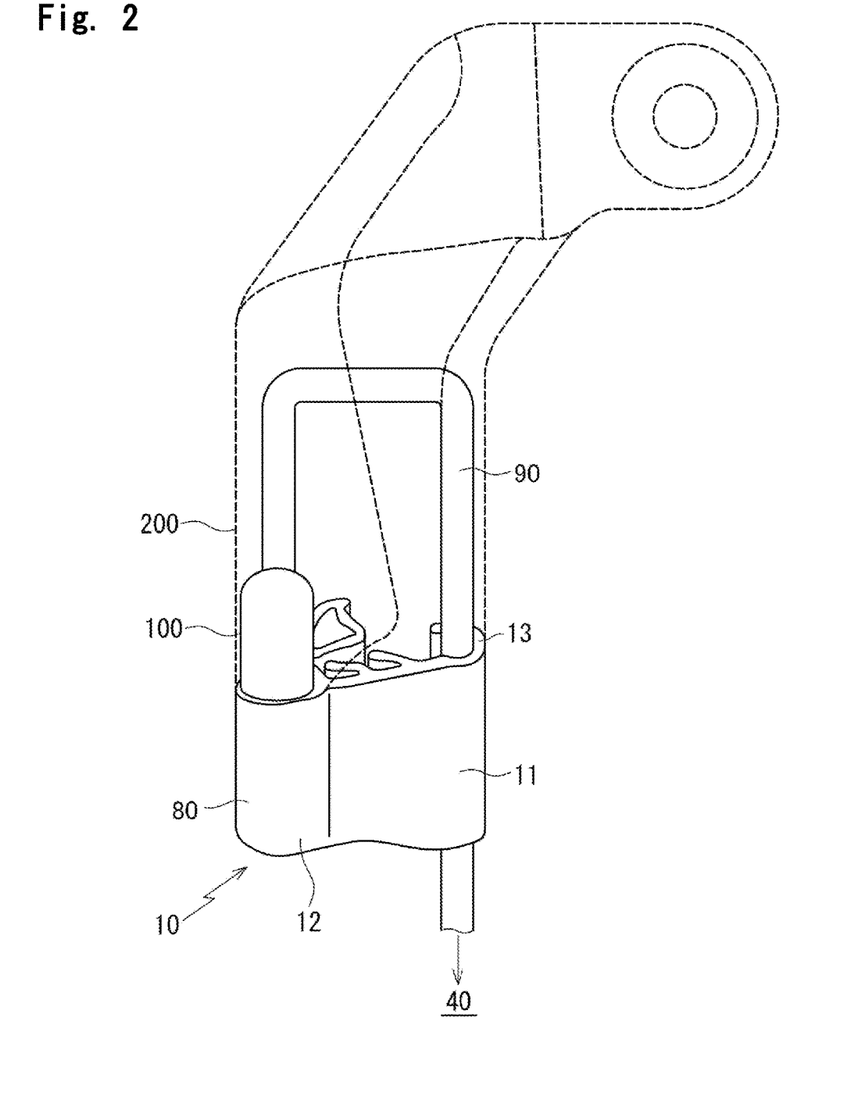
FIG. 2 is a perspective view of the lower side terminal part of the protector with the sensor of FIG. 1, having a secondary sealing layer formed thereon.
Figure 3:
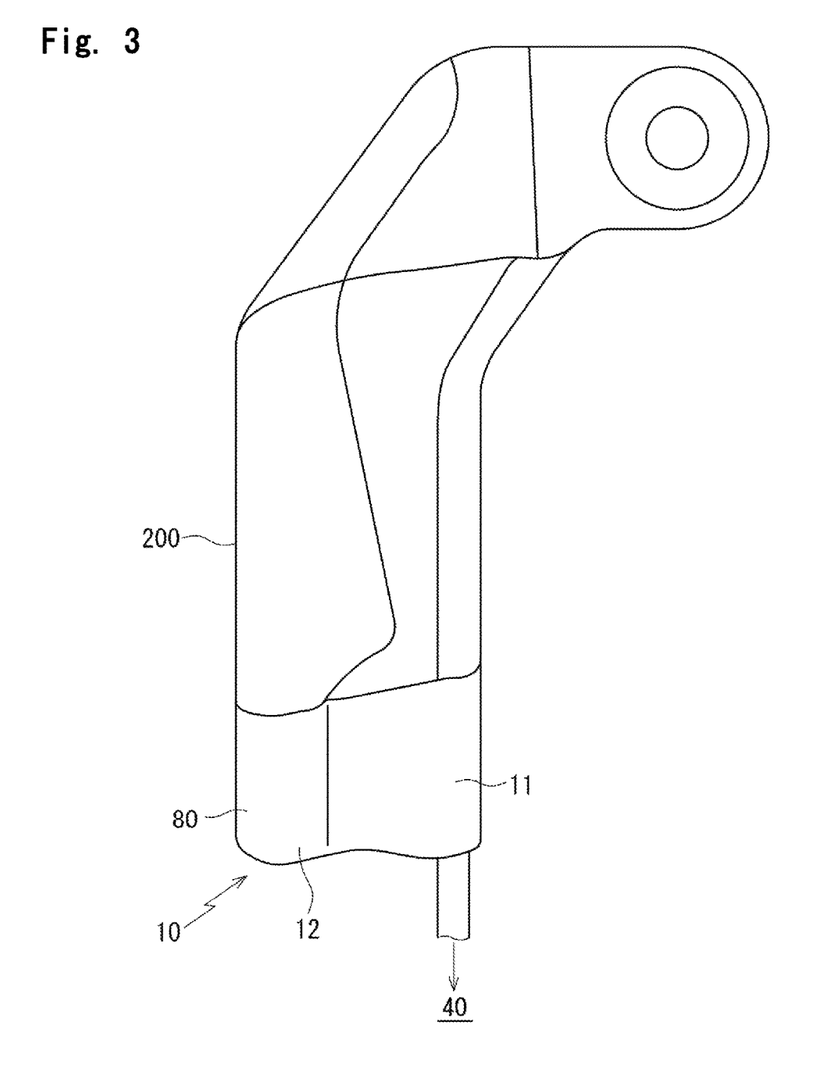
FIG. 3 is a perspective view of the lower side terminal part of the protector with the sensor of FIG. 2, having the secondary sealing layer formed thereon.

Then, as shown in FIG. 2, the terminal part of the protector 10 with the sensor, having the primary sealing layer 100 formed thereon, is positioned in a secondary die not shown for forming a secondary seal by means of the ordinary injection molding in a manner that the secondary sealing layer 200 coats a part formed with a primary seal from an outside. As a result, as shown in FIG. 3, the secondary sealing layer 200 forms an external shape of the lower end of the protector 10 with the sensor as a product.

The die molding material of the secondary sealing layer 200 fuses the primary sealing layer 100 during the injection molding of the secondary sealing layer 200. The die molding material of the secondary sealing layer 200 is made of the rubber like elastic body including: EPDM (ethylene-propylene-diene terpolymer); EPM (ethylene-propylene copolymer); TPO (olefin thermoplastic elastomer); and TPS (styrene thermoplastic elastomer).

In the terminal part of the extrusion molded part, the secondary sealing layer 200 abuts an end surface and coats a side surface of the hollow part 12. On the other hand, the secondary sealing layer 200 abuts an end surface and does not coat a side surface of the installation base member 11.

According to the protector 10 with the sensor, the terminal part of the extrusion molded part is die molded after the insertion part 25a of the insert 25 made of the non-conductive material is inserted in and fills up the space 33. The structure prevents decline in sensor function caused by die molding material flowing into a side of the sensor 80 from the space 33 on the terminal part of the extrusion molded part during the die molding. In addition, the insertion part 25a of the insert 25 inserted in the space 33 separates the two wire connection parts 70, 70 from each other and prevents the two wire connection parts 70, 70 from coming into contact with each other.

The wire connection parts 70, 70 of the core wires 31, 32 and the two leads 36, 36, which are exposed from the terminal part of the extrusion molded part, are doubly sealed by the primary sealing layer 100 and the secondary sealing layer 200. The structure improves certainty in sealing property in the terminal part.

In addition, the primary sealing layer 100 and the secondary sealing layer 200 are formed by means of the ordinary injection molding. Accordingly, as compared with a case using adhesive, the primary sealing layer 100 and the secondary sealing layer 200 do not necessitate time for curing the adhesive, which reduces time for operation and lowers cost. Further, since the structure enables to quantitatively inject the die molding material into the dies at stable pressure, resultant products are hardly uneven and perform stable sealing function.

When forming the primary sealing layer 100 which directly covers the wire connection parts 70, 70 by means of injection molding, the skin of the end part of the wire harness 90 as well as the terminal part of the extrusion molded part is positioned on the primary die for covering the wire connection parts 70, 70 of the core wires 31, 32 and the leads 36, 36 and a side of the protrusion part 25b of the insert 25, while also covering the skin of the wire harness 90. The structure is different from a prior art (FIG. 11) prepared by positioning the covered parts 37, 37 of the leads 36, 36, drawn out from the end part of the wire harness 90, on the primary die. Accordingly, the structure is excellent in operability and is capable of stably holding the wire connection parts 70, 70 while forming the external shape of the product by the secondary sealing layer so that the wire connection parts 70, 70 are hardly affected by injection molding pressure. In addition, since the primary sealing layer 100 is formed by means of the injection molding, each of the resultant products are uniform in the external shapes of the primary sealing layers 100. Accordingly, unevenness in the external shapes of the resultant products which arises while molding the secondary seal is prevented.

In addition, the die molding material of the primary sealing layer 100 includes the rubber like elastic body which fuses the terminal part of the extrusion molded part of the protector 10 during the injection molding of the primary sealing layer 100. The extrusion molded part of the protector 10 is made of the rubber like elastic body and extrusion molded. The die molding material of the secondary sealing layer 200 also includes the rubber like elastic body which fuses the primary sealing layer 100 during the injection molding of the secondary sealing layer 200. The structure is excellent in the following-up property, and the primary sealing layer 100 and the secondary sealing layer 200 do not easily come off even in case the primary sealing layer 100 and the secondary sealing layer 200 are subjected to stress. The structure prevents entrance of water. In addition, in case the insert 25 is made of material which fuses the primary sealing layer 100, the insert 25, the primary sealing layer 100 and the secondary sealing layer 200 unify, thereby forming a structure which hardly allows the entrance of water.

Figure 4:
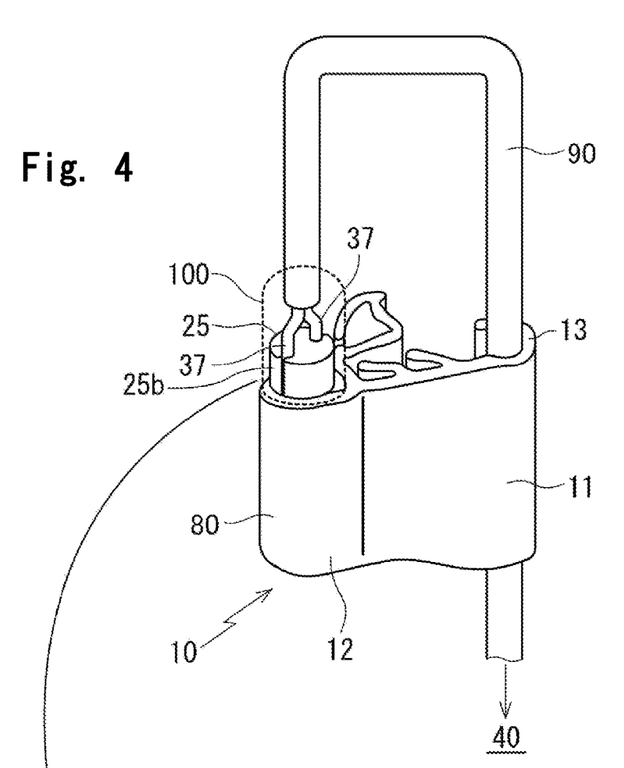
FIG. 4 is a perspective view of a lower side terminal part of a protector with a sensor according to another embodiment of the present invention, having a primary sealing layer formed thereon.
Figure 4A:
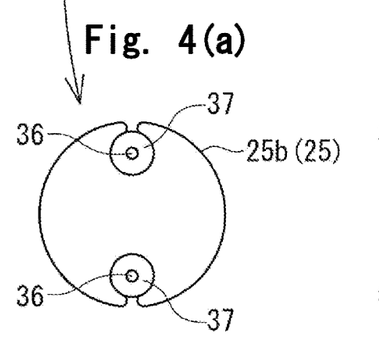
FIG. 4(a) is a top view of the insert shown in FIG. 4 having channels formed in the protrusion part.
Figure 4B:
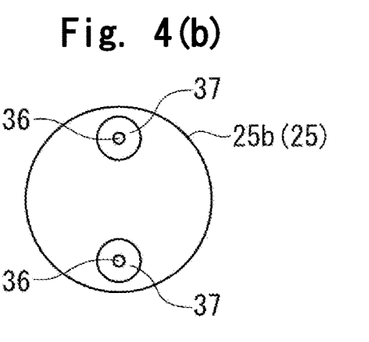
FIG. 4(b) is a top view of the insert shown in FIG. 4 having holes formed in the protrusion part.

In the present embodiment, the two wire connection parts 70, 70 come into contact with one side surface side and another side surface side of the protrusion part 25b of the insert 25, while the two wire connection parts 70, 70 are exposed from the terminal part. But, as shown in FIG. 4(*a*) and FIG. 4(*b*), the wire connection parts 70, 70 exposed from the terminal part of the protector 10 with the sensor may be embedded in the insert 25 (channels formed in the protrusion part 25*b* as shown in FIG. 4(*a*) or holes formed in the protrusion part 25*b* as shown in FIG. 4(*b*)). In this case also, the primary seal is formed by positioning the end part of the wire harness 90 as well as the terminal part of the extrusion molded part on the primary die so that the primary seal overlaps the skin of the wire harness 90.

While the present embodiment specifies an example that the installation base member 11, the hollow part 12 and the sensor 80 are integrally molded, the installation base member 11, the hollow part 12 and the sensor 80 may be separately molded so that the installation base member 11 and the hollow part 12 are fixed by adhesive or adhesive tape, and the sensor 80 is inserted in the hollow part 12 for unification. Alternatively, any two of the installation base member 11, the hollow part 12 and the sensor 80 may be integrally molded and a remaining member is separately molded.

In the present embodiment, the installation base member 11 has a plurality of holding lips 14 formed inside and a core 15 having a substantially U-shaped cross section embedded therein. But the installation base member 11 may have only one holding lip 14, 14 or may be without the core 15 embedded therein. Also, any installation base member 11 having a part thereof for fixing the hollow part 12 and the sensor 80 thereon is usable. Methods of fixing the hollow part 12 and the sensor 80 on the sliding door 1 vary, including use of adhesive tape as well as gripping and fitting the hollow part 12 and the sensor 80.

The present embodiment specifies an example that the protector 10 with the sensor is installed on the sliding door 1 side of the automobile, which slides frontward and rearward. But the protector 10 with the sensor may be installed on the body side opening for detecting the object between the sliding door and the body side opening.

Also, the protector 10 with the sensor is applicable to a back door or a sun roof 2 (FIG. 6).

We claim:

1. A protector with a sensor comprising:
   an installation base member operatively coupled on at least one of a peripheral edge of an opening/closing panel or a peripheral edge of an opening of an automobile body, said opening/closing panel being moveable between at least two positions to open and close said opening of the automobile body, the opening/closing panel being selected from a group consisting of a door of an automobile and a sun roof of the automobile; and a hollow part unified with the installation base member, the hollow part having two core wires and a space provided therein, the space being positioned between the two core wires; said installation base member and said hollow part forming an extrusion molded part made of a rubber like elastic body, in which:
   when an object is disposed between said opening/closing panel and said opening and makes contact with said hollow part when said opening/closing panel is moved towards a closed position, an electric signal provides an indication that said object is in said opening; and
   in a terminal part of said extrusion molded part, said core wires extending in a direction parallel to the peripheral edge of said opening are connected with two leads extending from an end part of a wire harness, said two leads being joined with a control unit, said two leads being covered with an insulator, the wire harness being formed by piling the two leads and covering the two leads with skin, and one end side of an insert made of a non-conductive material is inserted in and fills up said space, and said terminal part of said extrusion molded part is die molded, wherein:
   the terminal part of said extrusion molded part has a primary sealing layer and a secondary sealing layer, said primary sealing layer covering wire connection parts of said core wires and said leads and another end side of said insert while also covering the skin of said wire harness, and said secondary sealing layer covering the primary sealing layer, and said secondary sealing layer forming an external shape of a product.

2. The protector with the sensor as claimed in claim 1, wherein: in the terminal part of said extrusion molded part, said secondary sealing layer abuts an end surface and coats a side surface of said hollow part, and said secondary sealing layer abuts an end surface and does not coat a side surface of said installation base member.

3. The protector with the sensor as claimed in claim 1, wherein: die molding material of said primary sealing layer comprises the rubber like elastic body which fuses the terminal part of said extrusion molded part during the injection molding of said primary sealing layer and the die molding material of said secondary sealing layer comprises the rubber like elastic body which fuses said primary sealing layer.

4. The protector with the sensor as claimed in claim 1, wherein: the skin of said wire harness fuses one of or both of said primary sealing layer and said secondary sealing layer.

5. The protector with the sensor as claimed in claim 1, wherein: the die molding material of said primary sealing layer comprises one of or a blend among not less than two of: ethylene-propylene copolymer, EPDM, or EPM; or TPO or TPS.

6. The protector with the sensor as claimed in claim 2, wherein: die molding material of said primary sealing layer comprises the rubber like elastic body which fuses the terminal part of said extrusion molded part during the injection molding of said primary sealing layer and the die molding material of said secondary sealing layer comprises the rubber like elastic body which fuses said primary sealing layer during the injection molding of said secondary sealing layer.

7. The protector with the sensor as claimed in claim 2, wherein: the skin of said wire harness fuses one of or both of said primary sealing layer and said secondary sealing layer.

8. The protector with the sensor as claimed in claim 3, wherein: the skin of said wire harness fuses one of or both of said primary sealing layer and said secondary sealing layer.

9. The protector with the sensor as claimed in claim 6, wherein: the skin of said wire harness fuses one of or both of said primary sealing layer and said secondary sealing layer.

10. The protector with the sensor as claimed in claim 2, wherein: the die molding material of said primary sealing layer comprises one of or a blend among not less than two of: ethylene-propylene copolymer, EPDM, or EPM; or TPO or TPS.

11. The protector with the sensor as claimed in claim 3, wherein: the die molding material of said primary sealing layer comprises one of or a blend among not less than two of: ethylene-propylene copolymer, EPDM, or EPM; or TPO or TPS.

12. The protector with the sensor as claimed in claim 6, wherein: the die molding material of said primary sealing layer comprises one of or a blend among not less than two of: ethylene-propylene copolymer, EPDM, or EPM; or TPO or TPS.

13. The protector with the sensor as claimed in claim 4, wherein: the die molding material of said primary sealing layer comprises one of or a blend among not less than two of: ethylene-propylene copolymer, EPDM, or EPM; or TPO or TPS.

14. The protector with the sensor as claimed in claim 7, wherein: the die molding material of said primary sealing layer comprises one of or a blend among not less than two of ethylene-propylene copolymer, EPDM, or EPM; or TPO or TPS.

15. The protector with the sensor as claimed in claim 8, wherein: the die molding material of said primary sealing layer comprises one of or a blend among not less than two of: ethylene-propylene copolymer, EPDM, or EPM; or TPO or TPS.

16. The protector with the sensor as claimed in claim 9, wherein: the die molding material of said primary sealing layer comprises one of or a blend among not less than two of: ethylene-propylene copolymer, EPDM, or EPM; or TPO or TPS.

17. A method of molding an end part of a protector with a sensor comprising: an installation base member operatively coupled on at least one of a peripheral edge of an opening/closing panel or a peripheral edge of an opening of an automobile body, said opening/closing panel being moveable between at least two positions to open and close said opening of automobile body, the opening/closing panel being selected from a group consisting of a door of an automobile and a sun roof of the automobile; and a hollow part unified with the installation base member, the hollow part having two core wires and a space provided therein, the space being positioned between the two core wires; said installation base member and said hollow part being made of a rubber like elastic body which is extrusion molded, in which:

when an object is disposed between said opening/closing panel and said opening and makes contact with said hollow part when said opening/closing panel is moved towards a closed position, an electric signal provides an indication that said object is in said opening; and in a terminal part of said extrusion molded part, said core wires extending in a direction parallel to the peripheral edge of said opening are connected with two leads extending from an end part of a wire harness, said two leads being joined with a control unit, said two leads being covered with an insulator, the wire harness being formed by tying the two leads and covering the two leads with skin, and one end side of an insert made of a non-conductive material is inserted in and fills up said space, and said terminal part of said extrusion molded part is die molded, the method comprising:

forming a primary seal by positioning the skin of the end part of the wire harness as well as the terminal part of said extrusion molded part on a die, and then covering wire connection parts of said core wires and said leads and another end side of said insert while also covering the skin of the wire harness; and forming a secondary seal on a part, formed with the primary seal, for forming an external shape of a product.

* * * * *

UNITED STATES PATENT AND TRADEMARK OFFICE
CERTIFICATE OF CORRECTION

| | |
|---|---|
| PATENT NO. | : 9,605,473 B2 |
| APPLICATION NO. | : 14/639777 |
| DATED | : March 28, 2017 |
| INVENTOR(S) | : Michihiko Matsumoto et al. |

It is certified that error appears in the above-identified patent and that said Letters Patent is hereby corrected as shown below:

On the Title Page

Item (74) Attorney, Agent, or Firm, change "Robert P. Michael, Esq." to --Robert P. Michal, Esq.--

Signed and Sealed this
Ninth Day of May, 2017

Michelle K. Lee
*Director of the United States Patent and Trademark Office*